United States Patent Office 2,845,342
Patented July 29, 1958

2,845,342

METHOD OF RECOVERING FERROCHROMIUM

Marvin J. Udy, Niagara Falls, N. Y., assignor to Strategic-Udy Metallurgical & Chemical Processes Limited, Hamilton, Ontario, Canada No Drawing. Application March 12, 1953
Serial No. 342,017

7 Claims. (Cl. 75—11)

This invention relates to metallurgy and has for an object the provision of an improved process for recovering chromium in the form of ferrochromium from ores and other chromium-bearing materials. More particularly, the invention contemplates the provision of an improved process for producing ferrochromium products of high-carbon grade, containing 4% to 6% carbon, and medium carbon grade, containing 0.5% to 4% carbon and, particularly, medium carbon grades containing 0.1% to 2.0% carbon.

In the production of ferrochromium according to heretofore customary procedures, considerable difficulty has been encountered in controlling the carbon content of the ferrochromium. High-carbon ferrochromium of the 4% to 6% carbon grade has been produced customarily in single phase electric furnaces provided with top and bottom electrodes. Losses of chromium in the slag are high. Medium-carbon ferrochromium of the 1.5% to 2.0% grade customarily is made by blowing molten ferrochromium of the 4% to 6% grade with gaseous oxygen in a converter. Lower carbon grades of ferrochromium are produced by special processes involving the use of non-carbonaceous reducing agents such as silicon and aluminum. Production of the lower carbon grades of ferrochromium by means of heretofore customary practices is expensive and, also, wasteful with respect to chromium.

The production of ferrochromium of standard grades, containing, for example, 68 percent to 72 percent of chromium in accordance with heretofore customary practices required the use of chromate ores containing chromium and iron in a ratio not substantially lower than about 3.0 and iron to 1.0 iron (by weight). The process of my invention provides for the production of equivalent or identical grades of ferrochromium through the use of chromite ores containing chromium and iron in a ratio not greater than about 2.5 chromium to 1.0 iron, thus making available for the production of standard grades of ferrochromium tremendous sources of chromite heretofore considered to be of sub-standard grade for ferrochromium production. The process of my invention may be employed advantageously in the treatment of chromite ores of all grades with respect to their chromium and iron contents.

A process of the invention comprises a two-stage smelting operation employing arc electric smelting furnaces operated under two different types or sets of conditions with respect to positions of arcing tips of electrodes, reducing agents, fluxing agents and character of the charge undergoing treatment, among other factors.

The first stage of a preferred process of the invention utilizes a three-phase submerged arc electric furnace in which the arcing tips of the electrodes are submerged in a solid charge to a substantial depth below or beneath the surface of the charge and in which the electrodes are so spaced that the active areas overlap so that a single pool of molten metal and molten slag is formed and maintained beneath the electrodes.

The second stage of a preferred process of the invention utilizes an arc electric furnace in which there is maintained a molten bath comprising a layer of molten slag overlying or covering a bath of molten ferrochromium and in which the arcing tips of the electrodes are so disposed with respect to the upper surface of the layer of molten slag that the molten slag is maintained by means of combined electric arc and resistance heating at a temperature sufficiently high to promote and effect reduction to the metallic state by means of a suitable reducing agent of the chromium of chromic oxide or chomite added to or contained in the slag.

In a process of the invention, I smelt, in a submerged arc electric furnace, a charge comprising chromite ore and carbonaceous reducing material in amount sufficient to reduce to the metallic state either (1) only all of the iron of the chromite ore or (2) all of the iron and a substantial amount of chromium, not exceeding about eighty percent (80%), of the chromium of the chromite ore to produce a molten product containing molten metal and molten slag containing in oxide form the unreduced chromium of the chromite ore, and I introduce the molten product thus produced, including the molten metal and the molten slag, into an arc electric furnace to form therein a molten bath comprising molten metal covered by a layer of molten slag. In order to effect reduction to the metallic state of the chromium of chromium oxide contained in the slag and to permit the metallic chromium thus formed to pass downwardly through the slag to enter the molten metal beneath the slag with the production of molten ferrochromium containing iron and chromium of the original ore, I place on the surface of the layer of molten slag a suitable carbonaceous reducing agent such as coal or coke or a suitable non-carbonaceous reducing agent such as silicon, aluminum and magnesium. Silicon in the form of ferrochrome silicon (either low-carbon or high-carbon, so called) is preferred as the non-carbonaceous reducing agent.

When coal or coke is employed as the reducing material in the second stage of the process in which a layer of molten slag is subjected to a reducing treatment in an arc electric furnace, the coal or coke should be employed in the form of particles resulting from crushing larger particles to sizes sufficiently small to pass a one-half inch screen in order to provide particles of sufficient density and mass to project into and be wet by the molten slag. Normally, when a non-carbonaceous reducing material such as ferrochrome silicon is employed in order to obtain the benefits of the reducing capacity of its silicon content, it can be employed advantageously in the form of particles resulting from the crushing of larger particles to sizes sufficiently small to pass a one-quarter inch screen.

Calcium oxide when employed as hereinafter explained may be employed in the form of particles of any suitable sizes whether employed as free calcium oxide or as calcium oxide combined with carbon dioxide in the form of limestone (calcium carbonate). Normally, lime or limestone crushed to form particles small enough to pass a one inch screen may be employed advantageously. It is to be understood that the terms "lime" and "calcium oxide" as employed in the specification are intended to include calcium oxide as such and calcium oxide combined with carbon dioxide to form calcium carbonate.

In carrying out a process of the invention in order to produce high-carbon ferrochromium in which a carbonaceous reducing agent is employed in each stage of the process, the first stage, involving smelting of chromite ore in a submerged arc electric furnace preferably is carried out with carbonaceous reducing material not substantially in excess of that required to effect reduction of all of the iron of the chromite ore and about fifty percent (50%) to eighty (80%) of the chromium of the chromite ore. In carrying out such a process, it normally, is unnecessary to provide fluxing material in the first stage since alumina, magnesia and silica present in the ore are capable of forming a satisfactorily fluid slag. If necessary, however, in order to produce or provide satisfactory or optimum operating characteristics, lime or silica or alumina, or any two or more of such fluxing materials may be employed in order to provide or develop a slag of the desired fluidity.

In the second stage of a process employing a carbonaceous reducing agent in each stage for the production of high-carbon ferrochromium, the molten product of the first stage, including molten metal and molten slag, is treated in an arc electric furnace in which the slag is suitably adjusted to provide basic and acid components or constituents in a ratio greater than 1.5 base to 1.0 acid, preferably in the range, 1.7 to 2.2 base to 1.0 acid and, desirably about 2.0 base to 1.0 acid with lime (calcium oxide) being present in amount sufficient to form calcium carbide by reaction of the calcium oxide with carbon of the carbonaceous reducing material in order to insure substantially complete clearing from the slag of oxidized chromium.

In carrying out a process of the invention in order to produce medium-carbon ferrochromium in which a carbonaceous reducing agent is employed in the first stage and a non-carbonaceous reducing agent such as high-carbon or low-carbon ferrochrome silicon is employed as reducing material in the second stage, I prefer to employ, in the first stage, carbonaceous reducing material such as coal or coke in an amount not substantially greater than that required to reduce to the metallic state all of the iron of the chromite ore without effecting reduction to the metallic state of any substantial amount of the chromium of the chromite ore. In the first stage of such a process, a charge for the first stage is provided comprising chromite ore, a suitably limited amount of carbonaceous reducing material and basic fluxing material including calcium oxide in such amount that the non-carbonaceous portion of the charge will contain chromic oxide ($Cr_2O_3$) in the range, 20 percent to 30 percent in order to provide for improved or optimum furnace operating characteristics. In the second stage of such a process, I employ a non-carbonaceous reducing material such as ferrochrome silicon in amount sufficient to effect reduction to the metallic state by means of silicon of the oxidized chromium contained in the molten slag produced in the first stage, and I employ basic fluxing material in amount sufficient to establish and maintain in the residual slag a base to acid ratio above 1.5 to 1.0, preferably in the range 1.7 to 2.2 base to 1.0 acid and desirably in the range 2.0 base to 1.0 acid.

In employing combined electric arc and resistance heating (arc-resistance heating) for maintaining the molten slag bath at the desired temperature, in the second stage of my preferred process, I prefer to employ a covered electric arc furnace provided with one or more vertically extending electrodes. In operating such a furnace during the course of a process of the invention, I maintain the arcing tips of the one or more electrodes in sufficiently close proximity to the upper surface of the molten slag bath to inhibit dissipation of the arc-developed heat by reflection and to insure delivery to the molten slag bath of substantially all of the arc-developed heat, and I introduce charge material which comprises a carbonaceous or non-carbonaceous reducing agent into the furnace and onto the surface of the molten slag bath therein at a rate such as to maintain a low-pressure zone adjacent the arcing tips of the one or more electrodes.

The establishment of low-pressure zones results in avoidance when carbonaceous reducing agents are employed of the frequent periodic blowing of the charge out of the furnace with the consequent danger to operators and disturbance of the operation that takes place because of unpredictable and uncontrollable rates of reaction in high pressure zones created by establishing deep beds of charge material around the electrodes in accordance with heretofore customary practices.

Introduction of charge into the interior of the arc-resistance electric furnace is carried out at a rate such that it is deposited on the surface of the molten bath between the furnace walls and the electrodes without flowing into contact with the electrodes or at a rate such that it flows into contact with the electrodes and builds up around the electrodes to a depth of only a few inches.

In operating the electric furnace employing arc-resistance heating in accordance with a preferred process of the invention, the tips of the one or more electrodes preferably are maintained in positions with respect to the vertical ranging between about one-half inch ($\frac{1}{2}''$) above the surface of the slag bath and two inches ($2''$) below the surface of the slag bath. Immersion or penetration of the one or more electrodes in or into the molten slag bath to a depth short of that which will permit wetting of the electrodes by the slag will permit retention of the arc-resistance heating character of the operation. Tapping of the furnace is controlled to maintain in the furnace a slag bath having a depth not less than about three inches ($3''$) in order always to maintain between the arcing tips of the electrodes and the metal beneath the slag bath a layer of slag at least one inch ($1''$) in depth.

Through operation of the furnace constantly as an arc-resistance furnace with short arcs and constant or substantially fixed resistance by controlling the depth of the molten slag bath and the positions of the electrodes, I am able to operate constantly at power factor of 95% as compared with power factors of 75% to 85% at which arc electric furnaces, particularly steel furnaces, are operated in accordance with the heretofore customary practices.

In the operation of the electric furnace, automatic electrode regulators are set to maintain the electrodes in constant or substantially fixed positions relatively to the surface of the molten slag bath, because, for a particular type of operation, the slag is of substantially constant composition, and, therefore, of substantially constant resistance. When an increase or decrease in the temperature of the molten slag bath is desired for a particular operation, the voltage is increased or decreased and the electrode regulator is adjusted to maintain the arc length within the desired range (equivalent to the arc length established by maintaining the arcing tips of the electrodes in a position relatively to the vertical between about one-half inch ($\frac{1}{2}''$) above the surface of the slag bath and two inches ($2''$) below the surface of the slag bath). In following this procedure, the resistance is maintained constant and, consequently, the power input is increased or decreased.

The carbon content of a medium-carbon ferrochromium product produced in employing a two-stage process of the invention may be controlled advantageously by employing a controlled amount of carbonaceous reducing material in the first stage and by employing non-carbonaceous reducing material of predetermined composition with respect to carbon in the second stage. Carbon absorption, pick-up or solution in the first stage may be determined on the basis of the temperature of reduction employed and the amount of carbon employed for iron reduction or for iron and chromium reduction. In the second stage, adjustment of carbon content may be accomplished through utilization of non-carbonaceous material of selected or predetermined carbon content.

The following examples illustrate processes of the invention employing chromite ore and coke or chromite ore, coke and ferrochrome silicon of the following average compositions:

Chromite ore: Percent
    Chromic oxide ($Cr_2O_3$) ---------------- 46.07
    Ferrous oxide (FeO) ---------------------- 14.60
    Alumina ($Al_2O_3$) ------------------------ 11.00
    Magnesium oxide (MgO) ------------------ 17.53
    Silica ($SiO_2$) ---------------------------- 6.60
Coke: Fixed carbon (C) ---------------------- 85.0
Low-carbon ferrochrome silicon (50% Si):
    Chromium (Cr) --------------------------- 36.8
    Silicon (Si) ------------------------------- 50.0
    Iron (Fe) --------------------------------- 13.2
High-carbon ferrochrome silicon (23% Si):
    Chromium (Cr) --------------------------- 55.5
    Silicon (Si) ------------------------------- 23.0
    Iron (Fe) --------------------------------- 20.0
    Carbon (C) ------------------------------- 1.5
High-carbon ferrochrome silicon (20% Si):
    Chromium (Cr) --------------------------- 57.0
    Silicon (Si) ------------------------------- 20.0
    Iron (Fe) --------------------------------- 20.5
    Carbon (C) ------------------------------- 2.5

Example I

In carrying out a process of the invention to produce high-carbon ferrochromium of the four to six percent carbon (4% to 6% C) grade, ore of the above-indicated composition is smelted in a three-phase submerged arc electric furnace with coke (containing 85 percent of fixed carbon) in amount equal to about one hundred and fifty-two (152) pounds per one thousand (1000) pounds of ore to effect reduction to the metallic state of substantially all of the iron of the ore and approximately eighty percent (80%) of the chromium of the ore with the production of molten ferrochromium and molten slag containing chromium in oxide form. The molten product, including the ferrochromium and the slag, is introduced, while molten, into an arc electric furnace wherein the ferrochromium and slag separate to form a molten bath comprising molten ferrochromium covered by a layer of molten slag and wherein solid low-carbon ferrochrome silicon (50% Si) of the composition indicated above in an amount equal to 50.4 pounds per 1000 pounds of the original ore and crushed to pass a one-quarter inch (¼″) screen is placed on the surface of the layer of molten slag. The silicon of the added ferrochrome silicon functions to reduce to the metallic state the chromium of the chromium oxide of the slag. Crushed lime as such or in the form of limestone also is placed on the surface of the molten bath for fluxing silica formed by oxidation of the silicon of the added ferrochrome silicon and to form with the other bases present and the silica slag having about a 2.0 to 1.0 base-acid ratio. The metallic chromium thus produced and the iron and chromium of the added ferrochrome silicon pass through the residual molten slag and enter the molten bath of ferrochromium beneath the slag to form a composite molten ferrochromium product. A composite ferrochromium product thus produced contains approximately 69.0% chromium (Cr)
    25.5% iron (Fe) and
    4.8% carbon (C)
    .5% silicon (Si)

and weighs approximately 461 pounds per 1000 pounds of the original chromite ore, representing a recovery of approximately ninety-five percent (95%) of the chromium of the chromite ore.

Example II

In carrying out a process of the invention utilizing carbon and low-carbon ferrochrome silicon to produce medium-carbon ferrochromium, a charge comprising ore of the above-indicated composition and calcium oxide as such or in the form of limestone in amount sufficient to dilute the charge to about 20% to 30% chromic oxide is smelted in a three-phase submerged arc electric furnace with coke containing fixed carbon in amount equal to about thirty-one (31) pounds per 1000 pounds of ore to effect reduction to the metallic state of substantially all of the iron of the ore, without reducing any substantial amount of chromium, with the production of molten iron and molten slag containing the unreduced chromium in oxide form. The molten product, including the molten iron and the molten slag, is introduced, while molten, into an arc electric furnace wherein the iron and the slag separate to form a molten bath comprising molten metallic iron covered by a layer of molten slag and wherein solid low-carbon ferrochrome silicon (50% Si), of the composition indicated above, in an amount equal to 254 pounds per 1000 pounds of original ore and crushed to pass a one-quarter inch (¼″) screen is placed on the surface of the layer of molten slag. The silicon of the added ferrochrome silicon functions to reduce to the metallic state the chromium of the chromium oxide of the slag. Crushed lime as such or in the form of limestone also is placed on the surface of the molten slag layer, if necessary, for aiding in fluxing silica formed by oxidation of the silicon of the added ferrochrome silicon and establishing in the slag a base to acid ratio of about 2.0 to 1.0. The metallic chromium thus produced and the iron and chromium of the added ferrochrome silicon pass through the residual slag and enter the molten bath of iron beneath the slag to form a composite ferrochromium product. A composite ferrochromium product thus produced contains approximately 71.5% chromium (Cr)
    26.0% iron (Fe)
    1.0% silicon (Si), and
    1.5% carbon (C)

and weighs approximately 552 pounds per 1000 pounds of the original chromite ore smelted, representing a recovery of approximately 95 percent of the chromium of the chromite ore.

Example III

In carrying out a process of the invention utilizing carbon and high-carbon ferrochrome silicon to produce medium-carbon ferrochromium, a charge comprising ore of the above-indicated composition and calcium oxide as such or in the form of limestone in amount sufficient to dilute the charge to about 20% to 30% chromic oxide is smelted in a three-phase submerged arc electric furnace with coke containing fixed carbon in amount equal to about thirty-one (31) pounds per 1000 pounds of ore to effect reduction to the metallic state of substantially all of the iron of the ore, without reducing any substantial amount of chromium, with the production of molten iron and molten slag containing the unreduced chromium in oxide form. The molten product, including the molten iron and the molten slag, is introduced, while molten, into an arc electric furnace wherein the iron and the slag separate to form a molten bath comprising molten metallic iron covered by a layer of molten slag and wherein solid high-carbon ferrochrome silicon (23% Si), of the composition indicated above, in an amount equal to 570 pounds per 1000 pounds of original ore and crushed to pass a one-quarter inch (¼″) screen is placed on the surface of the layer of molten slag. The silicon of the added ferrochrome silicon functions to reduce to the metallic state the chromium of the chromium oxide of the slag. Crushes lime as such or in the form of limestone also is placed on the surface of the molten slag layer, if necessary, for aiding in fluxing silica formed by oxidation of the silicon of the added ferrochrome silicon and establishing in the slag a base to acid ratio of about 2.0 to 1.0. The metallic chromium thus produced and the iron and chromium of the added ferrochrome silicon pass through the residual slag and enter the molten bath of iron beneath the slag to form a composite ferrochromium product. A composite ferrochromium product thus produced contains approximately 71.6% chromium (Cr)
26.2% Iron (Fe)
1.57% silicon (Si), and
0.56% carbon (C)

and weighs approximately 855 pounds per 1000 pounds of the original chromite ore smelted, representing a recovery of approximately 95 percent of the chromium of the chromite ore.

I claim:

1. The method of producing ferrochromium of controlled carbon content which comprises smelting a charge comprising chromite ore in a three-phase submerged arc electric furnace in the presence of an amount of carbon sufficient to effect reduction to the metallic state of substantially all of the iron of the chromite ore but insufficient to effect reduction to the metallic state of all of the iron and all of the chromium of the chromite ore and forming a molten product containing molten metal and molten slag containing in oxide form the unreduced chromium of the chromite ore, introducing the molten product thus produced, including the molten metal and the molten slag, into an open-arc electric furnace to form therein a molten bath comprising molten metal covered by a layer of molten slag, placing on the surface of the layer of molten slag, at points remote from the arcing zones of the furnace electrodes, finely divided solid carbonaceous material and maintaining the layer of molten slag by means of combined electric arc and resistance heating at a temperature sufficiently high to promote and effect reduction to the metallic state of the chromium of the chromium oxide contained in the slag and permit the metallic chromium thus produced to pass downwardly through the residual molten slag and enter the molten metal beneath the slag with the production of molten ferrochromium containing iron and chromium of the original chromite ore, and separating the ferrochromium from the residual slag.

2. The method of producing ferrochromium of controlled carbon content which comprises smelting a charge comprising chromite ore in a three-phase submerged arc electric furnace in the presence of an amount of carbon sufficient to effect reduction to the metallic state of substantially all of the iron of the chromite ore but insufficient to effect reduction to the metallic state of all of the iron and all of the chromium of the chromite ore and forming a molten product containing molten metal and molten slag containing in oxide form the unreduced chromium of the chromite ore, introducing the molten product thus produced, including the molten metal and the molten slag, into an open-arc electric furnace to form therein a molten bath comprising molten metal covered by a layer of molten slag, placing on the surface of the layer of molten slag, at points remote from the arcing zones of the furnace electrodes, finely divided solid ferrochrome silicon and fluxing material and maintaining the layer of molten slag by means of combined electric arc and resistance heating at a temperature sufficiently high to promote and effect reduction to the metallic state of the chromium of the chromium oxide contained in the slag and permit the metallic chromium thus produced to pass downwardly through the residual molten slag and enter the molten metal beneath the slag with the production of molten ferrochromium containing iron and chromium of the original chromite ore, and separating the ferrochromium from the residual slag.

3. The method of producing ferrochromium of controlled carbon content which comprises smelting a charge comprising chromite ore in a three-phase submerged arc electric furnace in the presence of an amount of carbon sufficient to effect reduction to the metallic state of substantially all of the iron of the chromite ore but insufficient to effect reduction to the metallic state of all of the iron and all of the chromium of the chromite ore and forming a molten product containing molten metal and molten slag containing in oxide form the unreduced chromium of the chromite ore, introducing the molten product thus produced, including the molten metal and the molten slag, into an open-arc electric furnace to form therein a molten bath comprising molten metal covered by a layer of molten slag, placing on the surface of the layer of molten slag, at points remote from the arcing zones of the furnace electrodes, finely divided solid carbonaceous material and maintaining the layer of molten slag by means of combined electric arc and resistance heating at a temperature sufficiently high to promote and effect reduction to the metallic state of the chromium of the chromium oxide contained in the slag and permit the metallic chromium thus produced to pass downwardly through the residual molten slag and enter the molten metal beneath the slag with the production of molten ferrochromium containing iron and chromium of the original chromite ore, and separating the ferrochromium from the residual slag, basic fluxing material containing calcium oxide being employed as required to maintain in the residual slag a base to acid ratio higher than 1.5 base to 1.0 acid with sufficient calcium oxide being present to insure the production of calcium carbide by reaction of the calcium oxide with carbon of the carbonaceous reducing material, thus to insure substantially complete clearing from the slag of chromium oxide.

4. The method of producing ferrochromium of controlled carbon content which comprises smelting a charge comprising chromite ore in a multi-phase submerged arc electric furnace in the presence of an amount of carbon sufficient to effect reduction to the metallic state of substantially all of the iron of the chromite ore but insufficient to effect reduction to the metallic state of all of the iron and all of the chromium of the chromite ore and forming a molten product containing molten metal and molten slag containing in oxide form the unreduced chromium of the chromite ore, introducing the molten product thus produced, including the molten metal and the molten slag, into a covered open-arc electric furnace provided with one or more vertically extending electrodes to form therein a molten bath comprising molten metal covered by a layer of molten slag, placing on the surface of the layer of molten slag, at points relatively remote from the arcing zones of the furnace electrodes, solid reducing material and fluxing material and maintaining the layer of molten slag by means of combined electric arc and resistance heating at a temperature sufficiently high to promote and effect reduction to the metallic state of the chromium of the chromium oxide contained in the slag and permit the metallic chromium thus produced to pass downwardly through the residual molten slag and enter the molten metal beneath the slag with the production of molten ferrochromium containing iron and chromium of the original chromite ore, and separating the ferrochromium from the residual slag, operation of the arc electric furnace being controlled to maintain the arcing tips of the one or more electrodes in sufficiently close proximity to the upper surface of the molten slag bath to inhibit dissipation of arc-developed heat by reflection and to insure delivery to the molten slag bath of substantially all of the arc-developed heat.

5. The method of producing ferrochromium of controlled carbon content which comprises smelting a charge comprising chromite ore in a multi-phase submerged arc electric furnace in the presence of an amount of carbon sufficient to effect reduction to the metallic state of substantially all of the iron of the chromite ore but insufficient to effect reduction to the metallic state of all of the iron and all of the chromium of the chromite ore and forming a molten product containing molten metal and molten slag containing in oxide form the unreduced chromium of the chromite ore, introducing the molten product thus produced, including the molten metal and the molten slag, into a covered open-arc electric furnace provided with one or more vertically extending electrodes to form therein a molten bath comprising molten metal covered by a layer of molten slag, placing on the surface of the layer of molten slag, at points relatively remote from the arcing zones of the furnace electrodes, solid reducing material and fluxing material and maintaining the layer of molten slag by means of combined electric arc and resistance heating at a temperature sufficiently high to promote and effect reduction to the metallic state of the chromium of the chromium oxide contained in the slag and permit the metallic chromium thus produced to pass downwardly through the residual molten slag and enter the molten metal beneath the slag with the production of molten ferrochromium containing iron and chromium of the original chromite ore, and separating the ferrochromium from the residual slag, operation of the arc electric furnace being controlled to maintain the arcing tips of the one or more electrodes in sufficiently close proximity to the upper surface of the molten slag bath to provide for the maintenance of arcs not greater in length than about one-half inch thus to inhibit dissipation of arc-developed heat by reflection and to insure delivery to the molten slag bath of substantially all of the arc-developed heat.

6. The method of producing ferrochromium of controlled carbon content which comprises smelting a charge comprising chromite ore in a multi-phase submerged arc electric furnace in the presence of an amount of carbon sufficient to effect reduction to the metallic state of substantially all of the iron of the chromite ore but insufficient to effect reduction to the metallic state of all of the iron and all of the chromium of the chromite ore and forming a molten product containing molten metal and molten slag containing in oxide form the unreduced chromium of the chromite ore, introducing the molten product thus produced, including the molten metal and the molten slag, into a covered open-arc electric furnace provided with one or more vertically extending electrodes to form therein a molten bath comprising molten metal covered by a layer of molten slag, placing on the surface of the layer of molten slag, at points relatively remote from the arcing zones of the furnace electrodes, solid reducing material and fluxing material and maintaining the layer of molten slag by means of combined electric arc and resistance heating at a temperature sufficiently high to promote and effect reduction to the metallic state of the chromium of the chromium oxide contained in the slag and permit the metallic chromium thus produced to pass downwardly through the residual molten slag and enter the molten metal beneath the slag with the production of molten ferrochromium containing iron and chromium of the original chromite ore, and separating the ferrochromium from the residual slag, operation of the arc electric furnace being controlled to maintain the arcing tips of the one or more electrodes in positions with respect to the vertical between about one-half inch (½") from the upper surface of the molten slag bath and about two inches (2") below the upper surface of the molten slag bath to inhibit dissipation of arc-developed heat by reflection and to insure delivery to the molten slag bath of substantially all of the arc-developed heat.

7. The method of producing ferrochromium of controlled carbon content which comprises smelting a charge comprising chromite ore in a multi-phase submerged arc electric furnace in the presence of an amount of carbon sufficient to effect reduction to the metallic state of substantially all of the iron of the chromite ore but insufficient to effect reduction to the metallic state of all of the iron and all of the chromium of the chromite ore and forming a molten product containing molten metal and molten slag containing in oxide form the unreduced chromium of the chromite ore, introducing the molten product thus produced, including the molten metal and the molten slag, into a covered open-arc electric furnace provided with one or more vertically extending electrodes to form therein a molten bath comprising molten metal covered by a layer of molten slag, placing on the surface of the layer of molten slag, at points relatively remote from the arcing zones of the furnace electrodes, solid reducing material and fluxing material and maintaining the layer of molten slag by means of combined electric arc and resistance heating at a temperature sufficiently high to promote and effect reduction to the metallic state of the chromium of the chromium oxide contained in the slag and permit the metallic chromium thus produced to pass downwardly through the residual molten slag and enter the molten metal beneath the slag with the production of molten ferrochromium containing iron and chromium of the original chromite ore, and separating the ferrochromium from the residual slag, operation of the arc electric furnace during the course of the process being controlled to maintain in the furnace a slag bath having a depth of not less than about three inches (3") and with the arcing tips of the one or more electrodes maintained in positions with respect to the vertical ranging about one-half inch (½") above the surface of the slag bath and two inches (2") below the surface of the slag bath in order always to maintain between the arcing tips of the electrodes and the metal beneath the slag bath a layer of slag at least one inch (1") in depth.

References Cited in the file of this patent

UNITED STATES PATENTS

| | | |
|---|---|---|
| 1,480,267 | Kalling et al. | Jan. 8, 1924 |
| 1,686,207 | Flodin | Oct. 2, 1928 |
| 1,751,083 | Gustafsson | Mar. 18, 1930 |
| 1,857,779 | Flodin et al. | May 10, 1932 |
| 1,901,367 | Gustafsson | Mar. 14, 1933 |
| 1,967,530 | Haglund | July 24, 1934 |
| 2,098,176 | Udy | Nov. 2, 1937 |
| 2,523,092 | Bryk et al. | Sept. 19, 1950 |
| 2,582,469 | Udy | Jan. 15, 1952 |